United States Patent [19]

Flotow et al.

[11] Patent Number: 4,560,048
[45] Date of Patent: Dec. 24, 1985

[54] COOLING SYSTEM FOR FRICTION CLUTCHES FOR VEHICLES

[75] Inventors: Richard A. Flotow, Butler; William H. Sink, Auburn, both of Ind.

[73] Assignee: Dana Corporation, Toledo, Ohio

[21] Appl. No.: 537,436

[22] Filed: Sep. 30, 1983

[51] Int. Cl.[4] .............................................. F16D 13/72
[52] U.S. Cl. ............................ 192/70.12; 192/113 B; 188/264 E
[58] Field of Search ......................... 192/70.12, 113 B; 188/264 CC, 264 D, 264 E

[56] References Cited

U.S. PATENT DOCUMENTS

| | | | |
|---|---|---|---|
| 1,956,188 | 4/1934 | Black | 188/264 D |
| 2,940,556 | 6/1960 | Jensen et al. | 188/264 D |
| 3,366,210 | 1/1968 | Webster | 192/70.12 |
| 3,366,211 | 1/1968 | May | 192/113 B |
| 3,610,384 | 10/1971 | Borck | 192/113 B |
| 3,791,498 | 2/1974 | Wassermann | 192/113 B |
| 4,014,410 | 3/1977 | Bryant | 192/70.12 |
| 4,023,661 | 5/1977 | Flotow | 188/264 E |

FOREIGN PATENT DOCUMENTS 2004335  3/1979  United Kingdom ............ 188/264 E

Primary Examiner—Samuel Scott
Assistant Examiner—Noah Kamen
Attorney, Agent, or Firm—R. M. Leonardi; R. H. Johnson

[57] ABSTRACT

Liquid cooling system for a multiple plate friction clutch. The cooling system provides cooling liquid completely around the contact surfaces of the friction discs and driving members of the clutch at the time the clutch is disengaged or during engagement of the clutch and the driven members of the clutch are stationary or rotating only slowly.

12 Claims, 6 Drawing Figures

COOLING SYSTEM FOR FRICTION CLUTCHES FOR VEHICLES

BACKGROUND OF THE INVENTION

This invention relates to friction clutches, and more specifically to a cooling system for such clutches.

It is well known to use so-called wet friction clutches for heavy duty applications in vehicles. When the duty cycle of the clutch includes, for example, a high frequency of clutch engagements, or heavy loads upon vehicle start, or both, substantial heat is generated due to the relative rotation under load between the driving and driven members of the clutch. This heat is dissipated by passing a cooling liquid, usually oil, between the interleaved driving and driven members of the clutch.

The periods of heat generation in a friction clutch basically occur when the clutch is in a partially disengaged condition (the driving members are rotating and the driven members are stationary) or during clutch engagement (both driving and driven members are rotating, but at different speeds). Because the driven elements of the clutch are rotating not at all or relatively slowly during both periods of heat generation, the cooling liquid supplied to the center of the clutch is distributed mainly over only the lower portions of the friction members in wet cluches which rely in large part upon centrifugal force imparted to the cooling liquid by the driven friction members to distribute cooling liquid to areas of heat build up, as exemplified by U.S. Pat. No. 3,749,217 entitled Fluid Clutch with Self-Contained Pump issued in the name of Carl D. Bush et al.

Our improved cooling system overcomes the problem described above by utilizing the rotation of the driving members of the clutch to impart movement to the cooling liquid to propel it into the upper portions of the clutch. Since the driving members of the clutch are rotating when the clutch is disengaged and rotating at a high speed relative to the driven members during clutch engagement, cooling liquid will be supplied uniformly completely around the driving and driven members with the result that heat build up in the upper portions of the driving and driven members is substantially reduced, resulting in improved clutch life and operation.

BRIEF SUMMARY OF THE INVENTION

This invention relates to a liquid cooling system intended for use with a multiple plate friction clutch in a vehicle drive train. The cooling system preferably uses oil as the cooling medium. The cooling liquid or oil is drawn from a sump in the clutch housing by a pump via a filter and heat exchanger which serves to cool the oil so that the pump delivers a flow of clean cool oil to the interior of the clutch. The flow of oil impinges on a pair of blades or impellers integral with the clutch pressure plate. The impellers throw the oil through openings in the driven friction discs or members all around the perimeter of the discs where the oil enters the spaces between the discs and interleaved driving clutch members and then is carried radially outwardly across the discs due to centrifugal force imparted to the oil by the driving clutch members which are rotating.

It is a principal object of our invention to provide an improved friction clutch cooling system which delivers cooling liquid all around the clutch even when the clutch driven members are stationary or rotating only slowly.

An advantaage of our invention is that if the driving and driven members have been heated due to the energy absorbtion in a clutch in heavy duty service, the friction discs will be less likely to warp because the cooling fluid has been uniformly distributed around the friction discs at all times.

The above and other objects, features and advantages of our invention will become apparent upon consideration of the detailed description and appended drawing.

DETAILED DESCRIPTION OF THE PREFERRED EMBODIMENT

Figure 1:
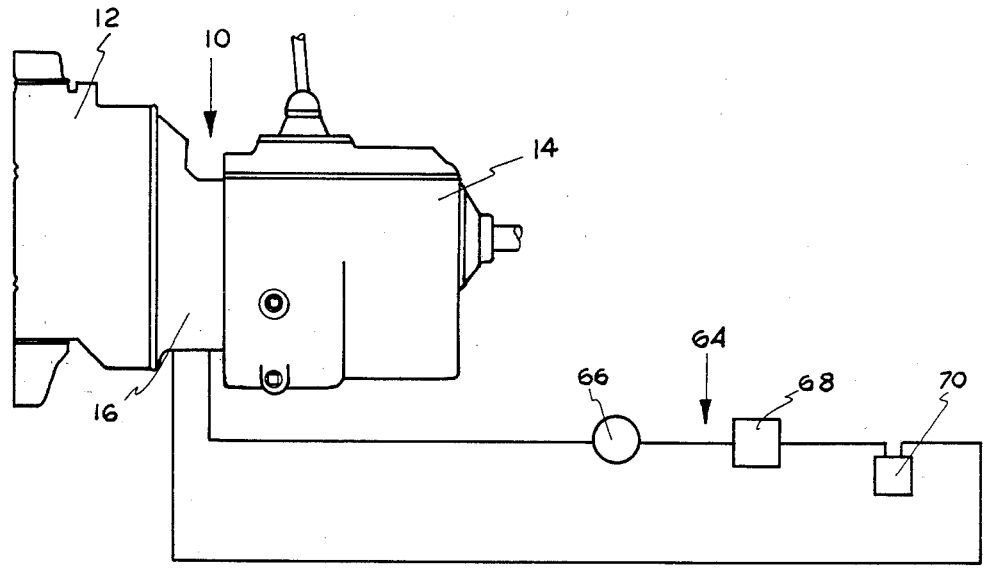
FIG. 1 is a schematic view showing the relationship of the clutch to an engine and a transmission and the circuitry and external components associated with the clutch cooling system.
Figure 3:
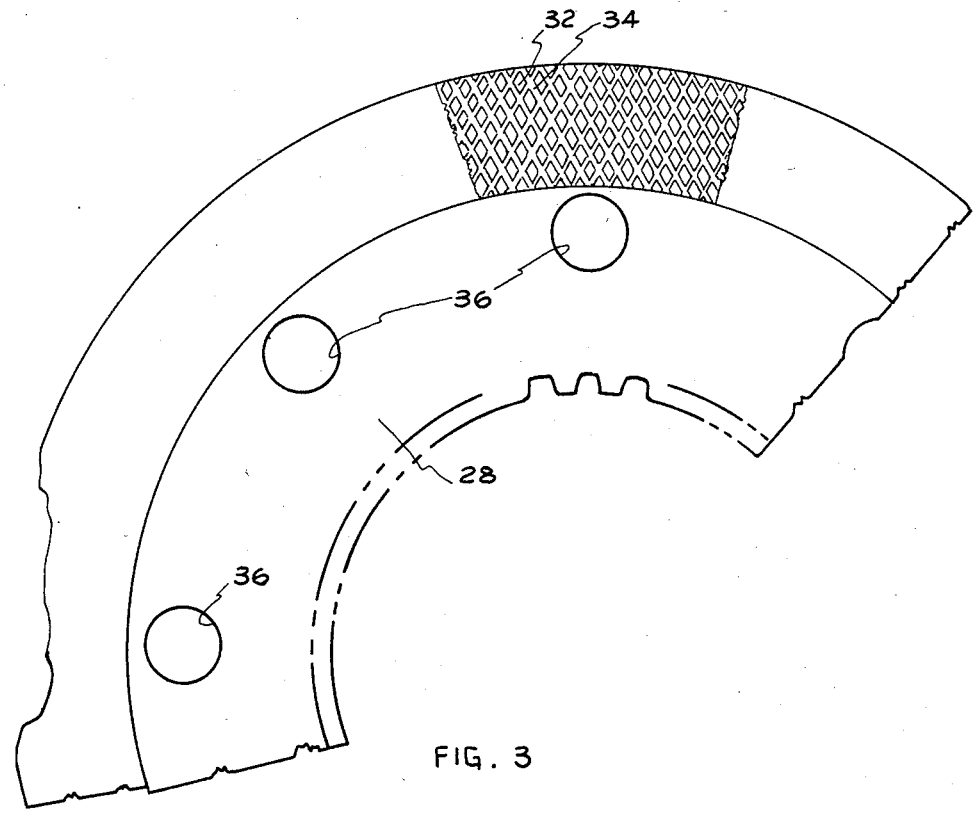
FIG. 3 is a view along line 3—3 showing to advantage a driven member or friction disc.

Referring to FIG. 1, the reference numeral 10 denotes a multiple plate friction clutch disposed between an engine 12 and a transmission 14.

Turning now also to FIGS. 2 through 6, clutch 10 will be described in detail. Clutch 10 is located within a housing 16 which includes a portion at the bottom thereof which serves as a sump 18. Housing 16 normally is adapted to be connected to engine 12 at one end and to have transmission 14 connected to it at the other end so that clutch 10 is completely enclosed.

Clutch 10 includes a flywheel ring 20 and a pair of intermediate plates 22, both of which are connected to an engine flywheel 24 for rotation with it. Carried by flywheel ring 20 is a pressure plate 26 which is arranged to rotate with flywheel ring 20, and also is movable axially relative to the axis of clutch rotation.

At this point it will be clear that flywheel ring 20, intermediate plates 22 and pressure plate 24 can all be considered to be driving members of clutch 10 since they are connected to rotate at all times with flywheel 24 of engine 12.

Disposed between flywheel 24 and pressure plate 26 and interleaved with intermediate plates 22 is a plurality of friction discs 28 which function as driven members of clutch 10. The assembly of intermediate plates 22 and friction discs 28 generally is referred to as a clutch pack 30. When clutch pack 30 is compressed by action of pressure plate 26, plates 22 and discs 28 are frictionally locked together for conjoint rotation so that power is transmitted through clutch 10. When pressure plate 26 is moved away from clutch pack 30, plates 24 and discs 28 are free to rotate relative to each other and no power is transmitted through clutch 30.

Each friction disc 28 carries a band of friction material 32 on each side of it which is scored with a series of generally radially extending grooves 34. Each friction disc 28 also includes a plurality of equidistantly-spaced openings 36 located closely adjacent the inner perimeter of intermediate plates 22.

Discs 28 are connected to an output hub 38 by means of a splined connection and hub 38 in turn is connected by means of a splined connection to a transmission input shaft 40, the outer end of which is supported in a pilot bearing 42 carried by flywheel 24.

Clutch 10 is engaged and disengaged by means of a mechanism which includes a release ring 44 carried by and rotatable with flywheel ring 20. Release ring 44 is movable axially along the axis of clutch rotation and is connected to a bearing ring 46 by means of a release sleeve 48 and a bearing 50. Bearing ring 46 in turn is connected to external clutch control linkage by means of a lever arm 52 so that through movement of arm 52 an operator can control engagement and disengagement of clutch 10.

A plurality of levers 54 are connected at one end to release ring 44 and pivotally mounted adjacent their outer ends in an adjustment ring 56 which is threadably connected to flywheel 20, thereby permitting axial movement of adjustment ring 22 to compensate for clutch wear. Levers 54 contact the back side of pressure plate 26.

Figure 2:
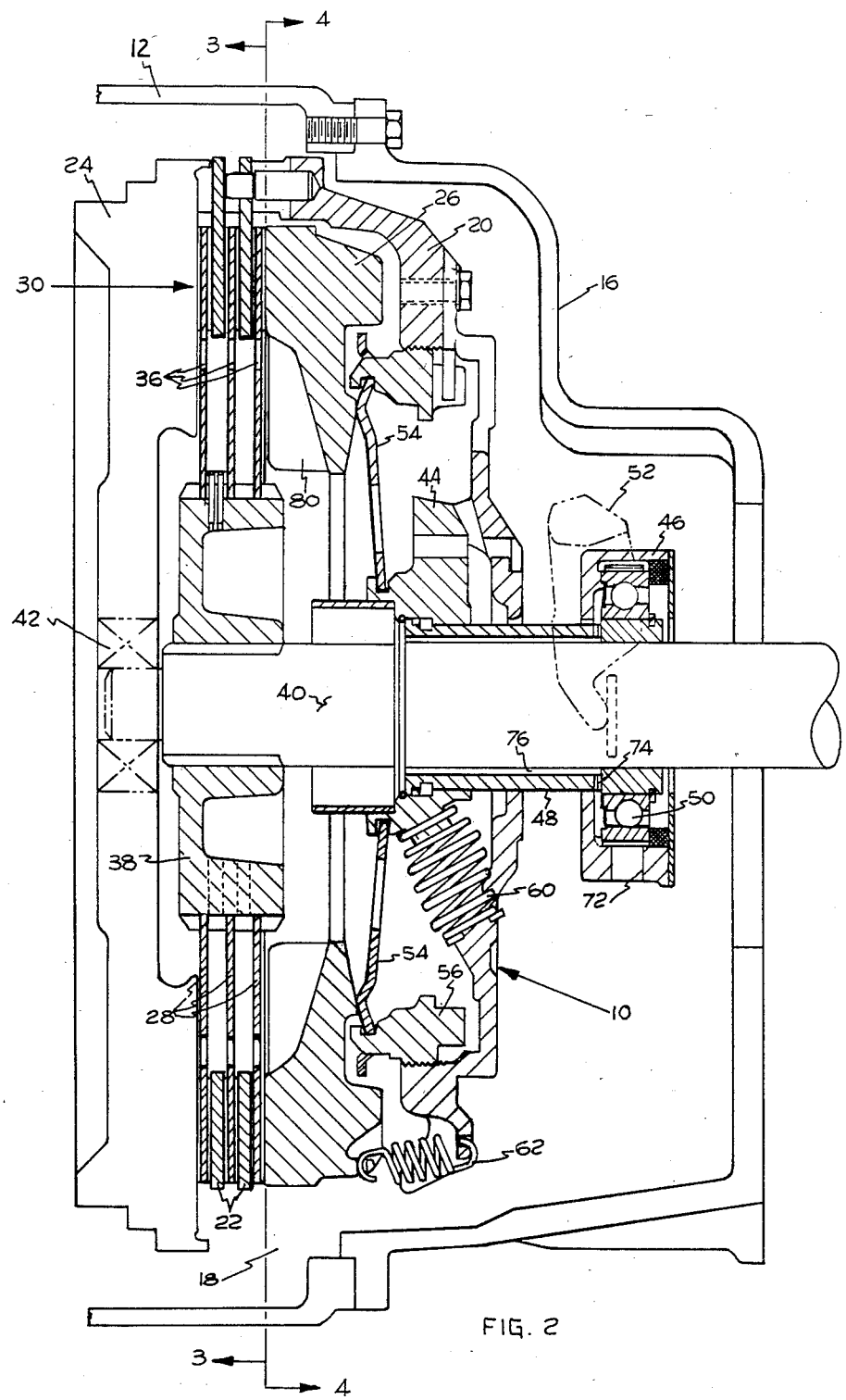
FIG. 2 is a cross-sectional view of a disengaged friction clutch incorporating our improved cooling system.
Figure 4:
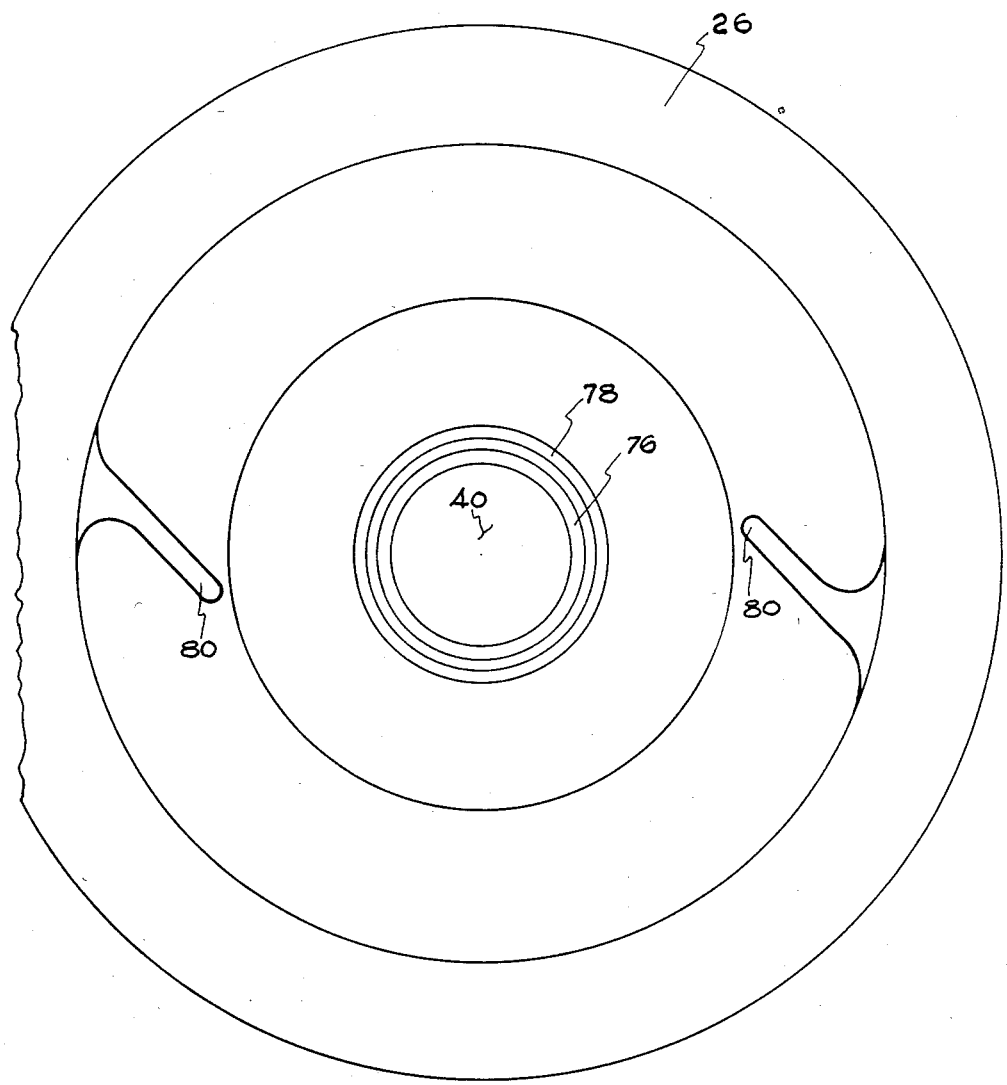
FIG. 4 is a view along line 4—4 showing to advantage the clutch pressure plate and the integral blades or impellers.
Figure 5:
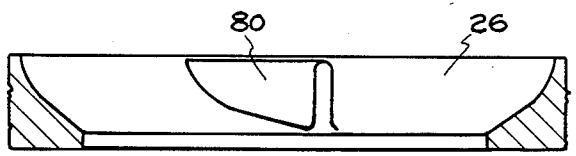
FIG. 5 is a fragmentary view of one blade.
Figure 6:
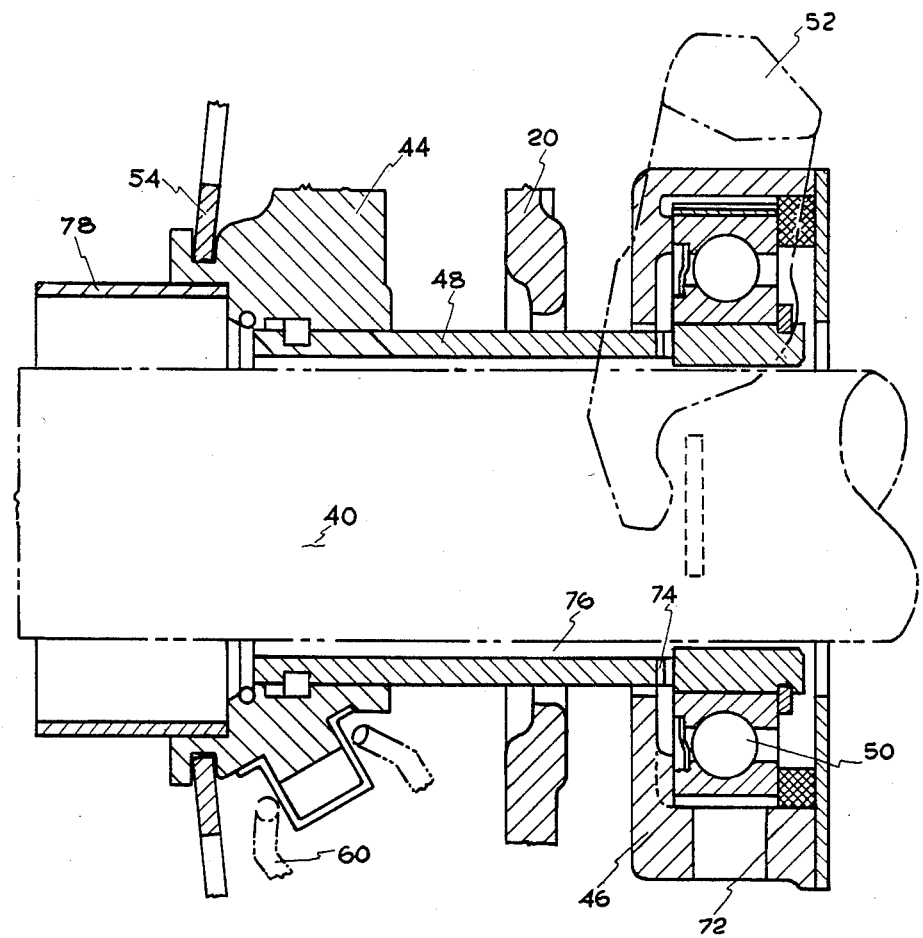
FIG. 6 is an enlarged fragmentary sectional view of the clutch release mechanism.

A plurality of compression springs 60 are disposed between release ring 44 and flywheel ring 20 so as to bias release ring 44 toward the left, as viewed in FIG. 2, with the result that through the action of levers 54 pressure plate 26 likewise is moved toward the left, compressing clutch pack 30 and thereby engaging clutch 10. When it is desired to disengage clutch 10, release ring 44 is moved toward the right, thus permitting pressure plate 26 to move toward the right due to the bias of a plurality of tension springs 62 connected between flywheel ring 20 and pressure plate 26.

Clutch 10 is provided with a liquid cooling system 64 in order to prevent undesirable build up of heat during the periods when clutch 10 is disengaged or being engaged. Liquid cooling system 64 provides a means of circulating cooling liquid, preferably oil, over intermediate plates 22 and friction discs 28 in order to dissipate heat generated due to relative rotation between friction discs 28 and intermediate plates 22, flywheel 24 and pressure plate 26. Liquid cooling system 64 includes a pump 66 connected in circuit to sump 18 via a cooler or heat exchanger 68 and filter 70. Pump 66 pulls oil from sump 18 and delivers cool clean oil to a port 72 in bearing ring 46. From port 72 the oil flows around bearing 50 and through a plurality of openings 74 in sleeve 48 into an annular passage 76 defined by sleeve 48 and transmission shaft 40. Pump 66 propels the oil along passage 76 and then out over an oil guide tube 78. Because oil guide tube 78 is rotating continuously due to its connection to engine flywheel 24, the oil spilling over the end of oil guide tube 78 is thrown radially outwardly due to centrifugal force so that it impinges upon a pair of blades or impellers 80 carried by and integral with pressure plate 26. Since pressure plate 26 also is rotating with flywheel 24, impingement of the oil or cooling liquid on blades 80 causes the oil to be spread all around the clutch and directed generally axially through openings 36 so that cooling liquid or oil is supplied completely across and around clutch pack 30 in the area adjacent the inner perimeter of intermediate plates 22 where a substantial amount of the cooling liquid will be picked up by the driving members of the clutch which are rotating and carried radially outwardly across the plates and discs due to centrifugal force.

At this point it will be seen that we have provided a liquid cooling system for clutch 10 which supplies cooling fluid completely around plates 22 and discs 28 even in the situation when discs 28 are stationary.

While only a single embodiment of our invention has been described, it will be understood that various modifications can be made to our invention without departing from the spirit and scope of it. For example, the deflection means could be a single spiral blade or the clutch could have just one friction disc. Therefore, the limits of our invention should be determined from the appended claims.

We claim:

1. A clutch having a pressure plate, at least one friction disc with a radially outer friction surface, a liquid cooling system comprising a plurality of openings in the friction disc positioned radially inwardly of said friction surface and circumferentially spaced around the friction disc, said pressure plate having an annular surface adjacent said plurality of friction disc openings and at least one deflector extending radially from said annular surface, said at least one deflector operable to direct cooling liquid into each of said openings, means for supplying liquid to a central region of said clutch, and means operable when said pressure plate is rotating for continuously distributing said liquid radially outwardly entirely around said pressure plate annular surface, whereby cooling liquid is supplied uniformly completely around the disc and plate even when said clutch is disengaged and the disc is stationary.

2. A clutch as set forth in claim 1 wherein said deflector is integral with said pressure plate.

3. A clutch as set forth in claim 1 wherein said pressure plate carries a plurality of circumferentially spaced deflectors.

4. A clutch as set forth in claim 1 further comprising at least one intermediate drive plate and a plurality of driven discs interleaved with said intermediate driving plate, wherein said liquid cooling system comprises a plurality of openings in each of said driven discs.

5. A clutch as set forth in claim 1 wherein said deflector is positioned radially inwardly of the outer periphery of said pressure plate in radial alignment with said openings in said friction disc.

6. A clutch as set forth in claim 1 wherein said means for supplying liquid includes a sump, a passageway and a pump in communication with said sump and said passageway to draw cooling liquid from said sump and propel it through said passageway onto said deflector.

7. A clutch as set forth in claim 6 wherein said clutch comprises a bearing ring and a release sleeve for engaging and disengaging said clutch and wherein said passageway includes a radially extending port through said bearing ring.

8. A clutch as set forth in claim 7 wherein said passageway further includes radially extending openings through said release sleeve.

9. A clutch as set forth in claim 6 wherein said passageway includes an axially extending guide tube having an outlet radially aligned with said at least one deflector.

10. A clutch as set forth in claim 9 wherein said guide tube is coaxial with and axially spaced from said release sleeve, and wherein said guide tube is fixed for rotation with said release sleeve.

11. A clutch as set forth in claim 6 wherein said means for supplying liquid includes a cooler connected in circuit between said sump and pump.

12. A clutch as set forth in claim 11 further comprising a filter connected in circuit between said sump and said cooler.

* * * * *